United States Patent [19]
Lebby et al.

[11] Patent Number: 6,131,017
[45] Date of Patent: Oct. 10, 2000

[54] DUAL SYSTEM PORTABLE ELECTRONIC COMMUNICATOR

[75] Inventors: Michael S. Lebby, Apache Junction; Davis H. Hartman, Chandler; Wenbin Jiang, Phoenix, all of Ariz.

[73] Assignee: Motorola, Inc., Schaumburg, Ill.

[21] Appl. No.: 09/049,534

[22] Filed: Mar. 27, 1998

[51] Int. Cl.$^7$ ...................................................... H04B 1/38
[52] U.S. Cl. .............................. 455/73; 455/74; 455/550; 455/553; 455/572
[58] Field of Search .................................. 455/73, 74, 84, 455/88, 90, 550, 552, 553, 566, 572, 573, 575, 347, 348, 349; 375/216; 429/98, 100

[56] References Cited

U.S. PATENT DOCUMENTS

| | | | |
|---|---|---|---|
| 5,228,074 | 7/1993 | Mizikovsky | 455/553 |
| 5,446,783 | 8/1995 | May | 455/572 |
| 5,786,106 | 7/1998 | Armani | 429/98 |
| 5,864,766 | 1/1999 | Chiang | 455/572 |
| 6,021,332 | 2/2000 | Alberth, Jr. et al. | 455/552 |

*Primary Examiner*—Nguyen Vo
*Assistant Examiner*—Lester G. Kincaid
*Attorney, Agent, or Firm*—Eugene A. Parsons; Lanny L. Parker

[57] ABSTRACT

A dual system communicator includes an electronic analog communicator and a removeably attached power source. The analog communicator includes analog signal transceiving electronics. The power source includes digital signal transceiving electronics. The analog communicator and the power source are wirelessly interfaced for communication between the digital signal transceiving electronics and the analog signal transceiving electronics. The dual system communicator is operational as a standard analog communicator or as a communicator capable of receiving digital signals which are converted to analog signals by a converter and transmitting analog signals which are converted into digital signals.

18 Claims, 3 Drawing Sheets

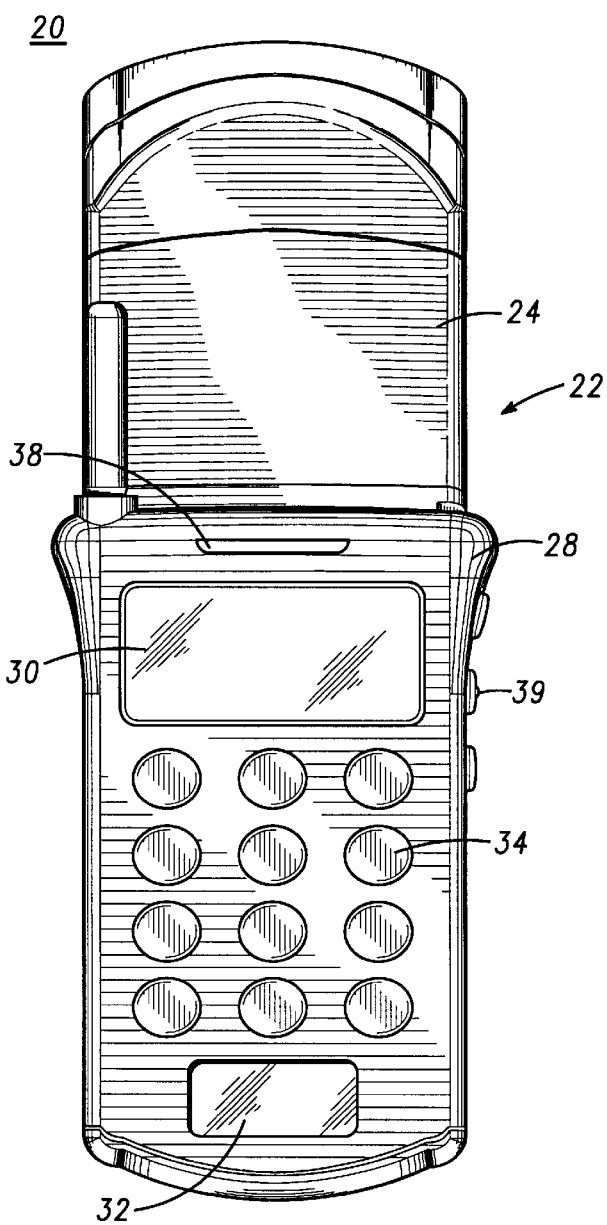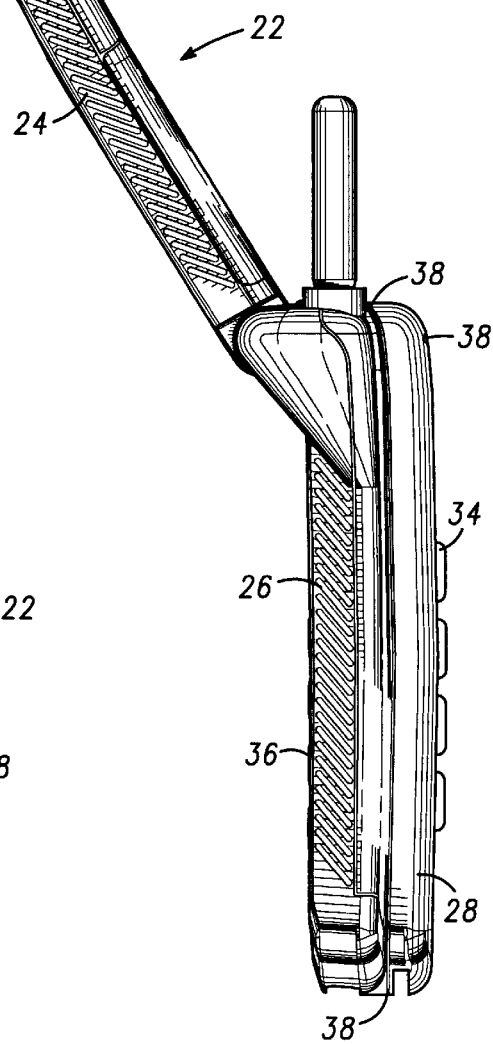

DUAL SYSTEM PORTABLE ELECTRONIC COMMUNICATOR

FIELD OF THE INVENTION

The present invention pertains to a dual system communicator. More particularly, this invention pertains to the combination of a battery source and digital system communicator interfaced with an analog system communicator.

BACKGROUND OF THE INVENTION

Portable electronics communication equipment, more particularly cellular communicators, such as cellular telephones have incurred phenomenal growth since their inception in 1983, and are anticipated to continue at record growth rates. It is currently estimated that there are well over 20 million subscribers in the United States alone, and approximately 50 million subscribers worldwide. Operation of cellular telephones has been traditionally by cellular analog technology. In order to keep up with this ever increasing demand for service, new digital signal cellular telephone systems have recently been introduced. Digital signal technology systems, such as Time Division Multiple Access (TDMA) systems, including North American Digital Cellular (IS-54), Global System for Mobile Communications (GSM), Personal Digital Cellular (PDC) and Code Division Multiple Access (CDMA) technology standards, have brought about an increased capacity for subscribers, and lower design costs. These lower design costs have led to a lower cost per subscriber and improvement of call quality, including better and more consistent sound, enhanced privacy, improved coverage characteristics, and increased talk time for portables due to precise power control. In addition, digital cellular technology provides for enhanced features, such as multiple vocoders simultaneously within the system which provide for better voice quality over current vocoders, short message services, over-the-air activation, sleep mode, subscriber unit ringing, subscriber access control, and data/fax capabilities.

Traditional analog cellular systems use radio frequency channels to operate. Typically, only one subscriber at a time is assigned to a specific channel, more particularly a discrete slice of the RF spectrum. No other conversations can access the channel until the subscriber's call is finished, or until that original call is handed off to a different channel by the system. Digital cellular systems utilize unique digital codes, rather than separate radio frequency signals or channels, to differentiate subscribers. During operation, each user is assigned a binary code during a call. At the receiving end, the digital codes are separated out, leaving only the original information. These codes are shared by both the cellular phone and the base station.

Many individuals currently own cellular analog telephone devices which operate using the traditional analog signal technology. Due to the benefits and enhanced features offered by digital cellular technology, there is a desire for many of these current analog cellular technology users to convert or switch to digital cellular technology. One of the most common factors encountered by today's cellular user in making this decision to convert to digital cellular technology is the initial cost of obtaining the required digital equipment. To aid in this conversion or deployment of digital cellular technology into the mainstream there exists a need for conversion equipment which will allow for the continued use of the already owned analog cellular equipment.

Accordingly, it is a purpose of the present invention to provide for a dual system portable electronic communicator that allows for portable electronic equipment to operate utilizing both analog cellular technology and digital cellular technology within an existing analog cellular communicator.

It is a further purpose of the present invention to provide a new and improved dual system portable electronic communicator that allows for modification of an existing analog cellular communicator to a communicator capable of utilizing digital cellular signals.

It is a further purpose of the present invention to provide a new and improved dual system portable electronic communicator that provides for digital cellular technology to be incorporated into a standard cellular communicator battery pack.

It is a further purpose of the present invention to provide for a wireless interface between the digital cellular technology communicator and the analog cellular technology communicator.

SUMMARY OF THE INVENTION

The above problems and others are at least partially solved and the above purposes and others are realized in a dual system portable electronic communicator including a portable electronic analog communicator and a removeably attached power source which includes digital signal transceiving electronics. The power source is fabricated as a standard battery pack for use with the analog cellular communicator. Included as a part of the battery pack is digital signal transceiving electronics. The power source, thus the interfaced digital signal transceiving electronics, are removeably attached and wirelessly interfaced with the analog cellular communicator.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

FIGS. 3 and 4 are simplified schematic views of a second embodiment of a dual system portable electronic communicator according to the present invention, illustrated in back and side views, respectively.

DESCRIPTION OF THE PREFERRED EMBODIMENTS

Figure 1:
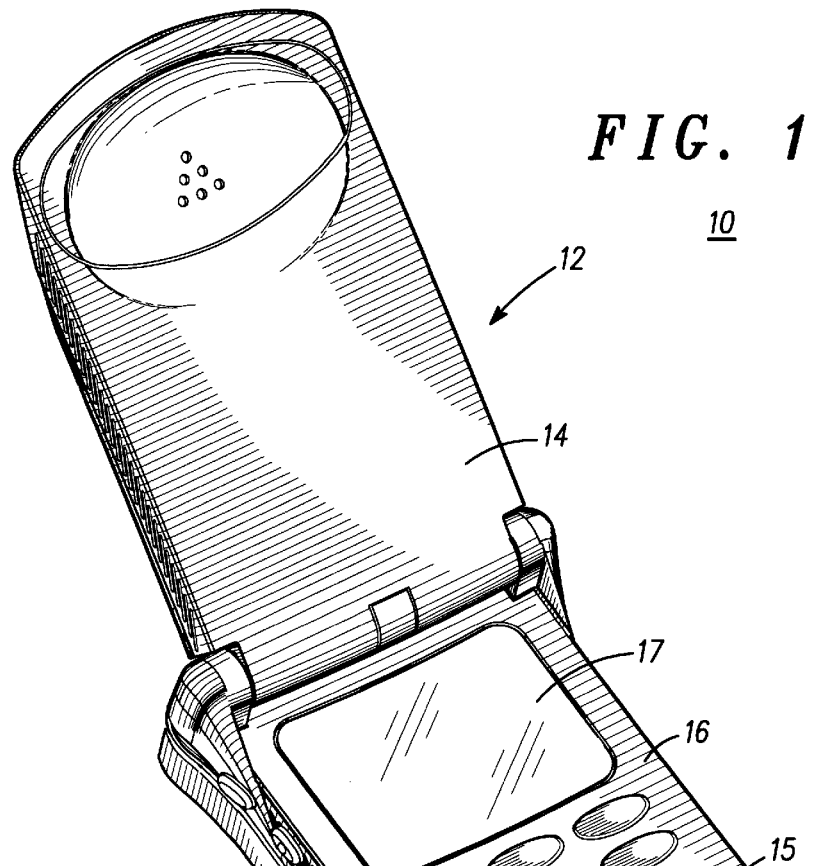
FIGS. 1 and 2 are simplified schematic views of a first embodiment of a dual system portable electronic communicator according to the present invention, illustrated in an open and closed position, respectively.
Figure 2:
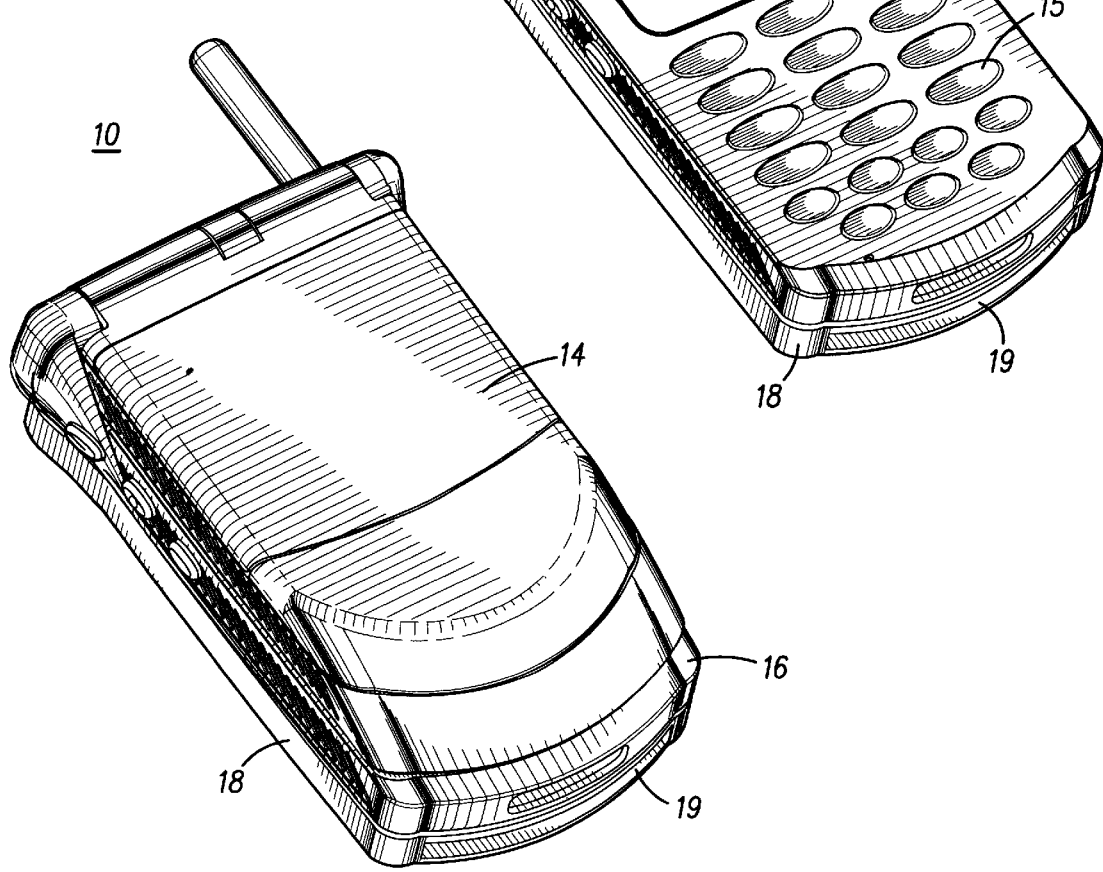

Referring specifically to FIGS. 1 and 2, illustrated in simplified schematic views is a first embodiment of a dual system portable electronic communicator 10 according to the present invention, illustrated in an open and closed position, respectively. In this particular embodiment, portable electronic communicator 10 is generally illustrated as a portable communications device and includes a standard analog signal communicator 12, commonly referred to as an analog cellular telephone, but may include any type of handheld electronic communicator, more particularly portable/handheld communication receivers, including a pager, two-way radio, portable telephone, or the like. In this particular embodiment, analog signal communicator 12 is fabricated having a hinged first major portion 14 and a second major portion 16. First major portion 14 and second major portion 16 are hingeably attached so as to allow for the positioning of first major portion 14 and second major portion 16 on top of each other when portable electronic communicator 10 is in a closed position as illustrated in FIG. 2. This particular embodiment of portable electronic communicator 10 includes a virtual image display 17 characterized as displaying informative data, such as a complete frame of alphagraphics, contained within portable electronic communicator 10 and a plurality of function buttons 15 for the input of informative data. It should be understood that portable electronic communicator 10 in the alternative can include a standard direct view display (not shown) for the display of basic informative data, such as numbers dialed, or the like. Further information on virtual image displays, such as that utilized for display 17 can be found in U.S. Pat. No. 5,224,198, entitled "WAVEGUIDE VIRTUAL IMAGE DISPLAY", issued Jun. 29, 1993, assigned to the same assignee and incorporated herein by this reference.

As illustrated in FIGS. 1 and 2, there is positioned on a rear side of second major portion 16 of analog signal communicator 12 a removeably attached battery power source with digital signal transceiving electronics 18 in electrical interface with analog signal communicator 12. Battery power source with digital signal transceiving electronics 18 provides power to portable electronic communicator 10, more particularly analog signal communicator 12, during portable usage. It should additionally be understood that there is provided on portable electronic communicator 10 a receptacle (not shown) for operation of portable electronic communicator 10 with a hardwired power source such as an AC/DC power source.

Power source with digital signal transceiving electronics 18 has included as a part thereof, digital signal transceiving capabilities. In addition, there is provided a wireless communication port (not shown), such as for use with infra red signals, thus an infra red communication interface, radio frequency signals, thus a radio frequency communication interface, or the like. The wireless communication port serves as a means for communication of signals received by the digital signal transceiving electronics with analog signal communicator 12. During operation, analog signal communicator 12, operating as a standard analog signal transceiving device, functions as a dual system communicator by transceiving digital signals through the digital signal transceiving electronics. Therefore, digital signals received by portable electronic communicator 10 are converted to analog signals and subsequently submitted to analog signal transceiving electronics located in analog signal communicator 12 through the wireless interface and vice versa for transmission purposes. This conversion of signal types allows for individuals to convert their standard analog cellular device, having attached thereto a standard power source, to a communicating device capable of receiving digital signals by simply replacing the standard power source with the inventive power source with digital signal transceiving electronics 18 as disclosed herein.

Power source with digital signal transceiving electronics 18 includes a wireless connection, such as an infra-red optical link or radio frequency link, so as to be in communication interface with analog signal communicator 12, more particularly analog signal transceiving electronics (discussed presently). In this particular embodiment, the digital signal transceiving electronics are in wireless communication with the analog signal transceiving electronics, thus signals received and generated by digital signal transceiving electronics are wirelessly communicated to analog signal transceiving electronics resulting in operation of portable electronic communicator 10 as an analog transceiving device utilizing digital signals. In the instance when an infra-red optical link is provided, a vertical cavity surface emitting laser (VCSEL) based free-space interconnect between the analog signal transceiving electronics of the analog signal communicator and the power source with digital signal transceiving electronics is anticipated. The use of a semiconductor based optical link allows for data transmission rates on the order of 1 Gbps to be achieved which helps the electronics read and if requested image the data easier and faster. In addition, in this particular embodiment power source with digital signal transceiving electronics 18 further includes a smart card reader and interface port 19 for the reading of informative data contained on a smart card. Further information on smart card readers and interface ports, such as that utilized for smart card reader and interface port 19 can be found in pending U.S. patent application Ser. No. 08/625,654 entitled "SMART CARD READER WITH VISUAL IMAGE DISPLAY", filed Mar. 29, 1996, assigned to the same assignee and incorporated herein by this reference.

Referring now to FIGS. 3 and 4, illustrated in simplified schematic views is a second embodiment of the dual system portable communicator according to the present invention. In this particular embodiment, a portable electronic communicator, generally referenced as 20, includes a standard analog signal communicator 22, specifically a standard analog cellular telephone, but may include any type of portable electronics equipment, more particularly portable/handheld communication receivers, including a pager, two-way radio, portable telephone, or the like. Portable electronic communicator 20, more particularly, analog signal communicator 22, is fabricated having a hinged first major portion 24 and a second major portion 26. First major portion 24 and second major portion 26 are hingeably attached so as to allow for the positioning of first major portion 24 and second major portion 26 on top of each other when portable electronic communicator 20 is in a closed position.

As illustrated in FIGS. 3 and 4, there is formed on a rear side of second major portion 26 of analog signal communicator 22 a removeably attached battery power source with digital signal transceiving electronics 28 in electrical interface with analog signal communicator 22. Power source with digital signal transceiving electronics 28 has included as a part thereof, digital signal transceiving capabilities. In addition, there is provided a wireless communication port (not shown), such as for use with infra red signals, radio frequency signals, or the like. As in the first embodiment, the wireless communication port serves as a means for communication of signals received by the digital signal transceiving electronics with the analog signal transceiving electronics of analog signal communicator 22. During operation, portable electronic communicator 20, operating as a standard analog signal transceiving device, functions as a dual system communicator by transceiving digital signals through the digital signal transceiving electronics. Therefore, digital signals received by the digital signal transceiving electronics of the power source with digital signal transceiving electronics 28 are submitted to analog signal transceiving electronics located in analog signal communicator 22 through the wireless interface.

Power source with digital signal transceiving electronics 28 includes a wireless connection so as to be in communication interface with analog signal communicator 22. In this particular embodiment, the digital signal transceiving electronics are in wireless communication with the analog signal transceiving electronics of analog signal communicator 22 by way of infra red connection (not shown), thus signals received and generated by digital signal transceiving electronics are wirelessly communicated to the analog signal transceiving electronics of analog signal communicator 22 resulting in operation of portable electronic communicator 20 as an analog transceiving device utilizing converted digital signals. In addition, in this particular embodiment, power source with digital signal transceiving electronics 28 has included as a part thereof a virtual image display 30, an input device 32, such as a touch pad, trackball, or the like, and a plurality of electronic tactile function buttons 34, typically a numerical keypad, for the input of informative data. It is in addition anticipated by this disclosure to include a smart card reading device (not shown) within dual system portable electronics communicator 20 as disclosed with regard to FIGS. 1 and 2, for the input and subsequent reading of data contained on a smart card. Electronic tactile function buttons 34 of power source with data signal transceiving electronics 28 are included as an additional input means, more particularly function buttons 34 are included in addition to a standard keypad 36 located on analog signal communicator 22.

As illustrated, power source with digital signal transceiving electronics 28 is detachably mounted to analog signal communicator 22 using a snap-fit connections 38. More specifically, power source 28 is mounted to a battery mounting receptacle/plate (not shown) utilizing a plurality of snap-fit connections 38 so as to align a battery contact plate (not shown) located on power source with digital signal transceiving electronics 28 with the contact plate of the battery receptacle/plate located on analog signal communicator 22, thereby achieving an electrical contact interface between power source with digital signal transceiving electronics 28 and analog signal communicator 22 and forming dual system portable electronic communicator 20.

It should be understood that electronic tactile function buttons 34 can be configured in any number of arrangements depending upon the user need and comfort. Portable electronics equipment 20 is designed to be held by an operator with one hand. An ON/OFF or power switch 39 can be located on the exterior of equipment 20, thereby allowing the user to power on or off the equipment as necessary. Other means of activating and deactivating power to portable electronics equipment 20 are anticipated by this disclosure.

During operation, a user communicating on dual system portable electronic communicator 10 or 20 can operate the device as a standard analog cellular device or as a device capable of receiving digital signals. There is included within the function buttons of the device, illustrated as 34 or 36 of FIGS. 3 and 4, a mode selection button so as to convert from a standard analog signal receiving device mode to a mode in which the device is capable of receiving digital signals and converting them into analog signals, and vice versa. It should be understood that the mode selection button is design oriented and can be positioned elsewhere on the device so as to be easily activated by the user.

Figure 5:
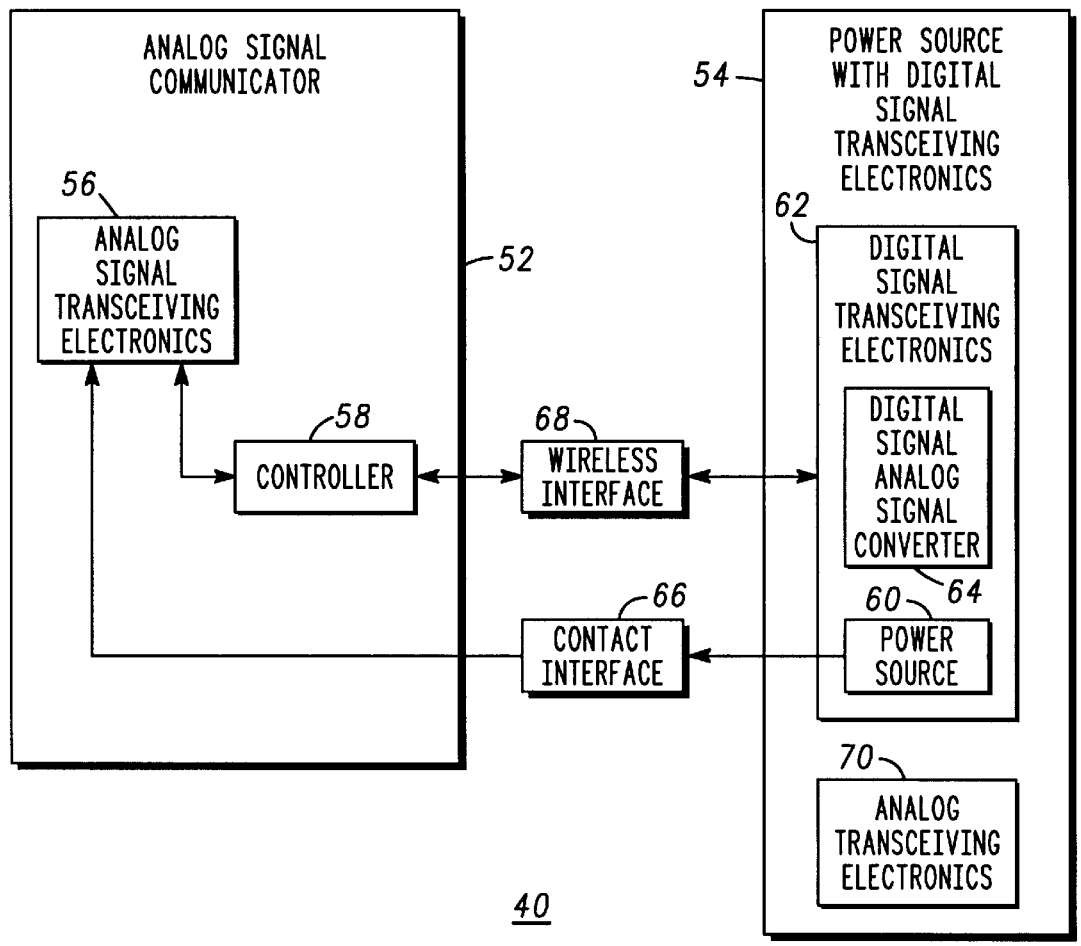
FIG. 5 is a block diagram of the electronics for the dual system communicator of the present invention.

Referring specifically to FIG. 5, a block diagram of the electronics for portable electronics equipment 10 embodying the present invention is illustrated, and thus aids in describing the operation of the dual system portable electronic communicator device of the present invention. As previously stated, the dual system portable electronic communicator, generally referenced as 40 in FIG. 5, can be any of the well known portable receivers, such as a cellular or cordless telephone, a two-way radio, a pager, etc., but in this particular illustration is generally similar to the dual system portable electronic communicator, or cellular telephone, previously discussed with reference to FIGS. 1–4. Portable electronics equipment 40 includes an analog signal communicator 52 and a power source with digital signal transceiving electronics 54. More specifically, analog signal communicator 52 includes analog signal transceiving electronics 56 having a data output connected to a controller 58 which may be a microprocessor, a DSP, a gate array, specially designed logic circuits, etc. It should be understood that transceiver electronics 56 inherently includes both analog signal receiving and transmitting capabilities. A memory (not shown) is optionally included and is connected to controller 58 and stores information and messages, graphic and/or alpha-numeric, received by analog signal transceiving electronics 52 in accordance with the programming of controller 58. More particularly memory can be provided to store a plurality of cursor manipulation functions for controlling a cursor in a virtual image display (not shown) optionally included as a part of analog signal communicator 52.

Power source with digital signal transceiving electronics 54 generally includes a battery, or power source 60 for supplying power to dual system portable electronic communicator 40, more particularly analog signal communicator 52. Power source 60 includes a contact interface 66 with analog signal communicator 52 for supplying power thereto. In addition, included are digital signal transceiving electronics 62 and a digital signal/analog signal converter 64. During standard operation, analog signal communicator 52 operates to receive analog signals through analog signal transceiving electronics 56 and is operational as a standard analog signal communicator. When a mode selection button is selected (discussed previously), analog signal communicator 52 is operational to receive digital signals. More particularly, power source with digital signal transceiving electronics 54, receives a digital signal through digital signal transceiving electronics 62. The digital signals are subsequently converted by converter 64 to analog signals which are submitted to analog signal communicator 52 through a wireless interface 68. During transmission, analog signals generated by analog signal transceiving electronics 56 are submitted to converter 64 through wireless interface 68 and converted to digital signals. The generated digital signals are subsequently transmitted by digital signal transceiving electronics 62. Thus, analog signal communicator 52 is operational as a standard analog signal communicator or as a converted digital signal communicator utilizing converted digital/analog signals. In yet another alternative embodiment, power source with digital signal transceiving electronics 54 additionally includes analog signal transceiving electronics 70. During operation of this embodiment, power source with digital signal transceiving electronics 54 is additionally capable of receiving and transmitting analog signals when in an operational state. There is no requirement for the user to select the mode of operation as previously discussed.

Accordingly, a new and improved dual system portable electronic communicator is disclosed. The new and improved dual system portable electronic communicator is designed as a small handheld electronic device and includes an analog signal communicator and a wirelessly interfaced power source with digital signal transceiving electronics. The device as disclosed allows for the conversion of a standard analog signal communicator to a communicator capable of utilizing digital signals by the simple attachment of a power source with digital signal transceiving electronics. As disclosed, there is included a mode selection button for selection of operation of the device as either an analog signal communicator or a digital signal communicator. In addition, disclosed is the incorporation into the device of a smart card reader and/or a virtual image display.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A dual system portable electronic communicator comprising:
    a portable electronic analog signal communicator including analog signal transceiving electronics;
    a power source removeably attached to the portable electronic analog signal communicator;
    digital signal transceiving electronics included within the power source; and
    a converter for converting received digital signals to analog signals and received analog signals to digital signals, the converter being coupled to the analog signal transceiving electronics and the digital signal transceiving electronics, whereby the portable electronic analog signal communicator is converted by the power source to operate in analog and digital modes of communication.

2. A dual system portable electronic communicator as claimed in claim 1 further including analog signal transceiving electronics included within the power source.

3. A dual system portable electronic communicator as claimed in claim 1 wherein the power source, includes a battery.

4. A dual system portable electronic communicator as claimed in claim 2 further including a wireless interface for communication interface between the digital signal transceiving electronics and the analog signal transceiving electronics of the portable analog communicator.

5. A dual system portable electronic communicator as claimed in claim 4 wherein the wireless interface for communication interface includes one of a radio frequency communication interface and an infra-red communication interface.

6. A dual system portable electronic communicator comprising:
    a handheld electronic communicator including analog signal transceiving electronics;
    a power source, removeably attached to the handheld electronic communicator and including digital signal transceiving electronics;
    a wireless interface for communication interface between the digital signal transceiving electronics and the analog signal transceiving electronics; and
    a converter coupled to the analog signal transceiving electronics and the digital signal transceiving electronics for converting received digital signals to analog signals and received analog signals to digital signals, whereby the handheld electronic communicator is converted by the power source to operate in analog and digital modes of communication.

7. A dual system portable electronic communicator as claimed in claim 6 further including a virtual display apparatus for providing a virtual image of a complete frame of alphagraphics in the virtual display apparatus, the virtual display apparatus being mounted in one of the handheld electronic communicator and the power source for viewing of the virtual image by an operator.

8. A dual system portable electronic communicator as claimed in claim 6 wherein the power source includes a battery.

9. A dual system portable electronic communicator as claimed in claim 6 wherein the wireless interface includes an infra-red communication interface.

10. A dual system portable electronic communicator as claimed in claim 6 wherein the wireless interface includes a radio frequency communication interface.

11. A dual system portable electronic communicator as claimed in claim 6 wherein the power source with digital signal transceiving electronics includes a contact interface for electrical communication between the power source and the analog signal transceiving electronics.

12. A dual system portable electronic communicator as claimed in claim 6 wherein the power source with digital signal transceiving electronics includes a plurality of function buttons for informative data input.

13. A dual system portable electronic communicator comprising:
    a handheld analog signal communication transceiver including analog signal transceiving electronics;
    a power source, removeably attached to the handheld analog signal communication transceiver and including digital signal transceiving electronics;
    a miniature virtual image display electrically connected to and mounted in one of the handheld analog signal communication transceiver and the power source;
    a wireless interface for communication interface between the digital signal transceiving electronics and the analog signal transceiving electronics;
    a contact interface for electrical interface between the power source and the handheld analog signal communication transceiver; and
    a converter coupled to the analog signal transceiving electronics and the digital signal transceiving electronics for converting received digital signals to analog signals and received analog signals to digital signals, whereby the handheld analog signal communication transceiver is converted by the power source to operate in analog and digital modes of communication.

14. A dual system portable electronic communicator as claimed in claim 13 wherein the handheld analog signal communication transceiver includes a mode selection button for operation in an analog signal transceiving mode and a digital/analog transceiving mode.

15. A dual system portable electronic communicator as claimed in claim 14 wherein the wireless interface includes an infra-red optical link.

16. A dual system portable electronic communicator as claimed in claim 14 wherein the wireless interface includes radio frequency link.

17. A dual system portable electronic communicator as claimed in claim 14 wherein the power source with digital signal transceiving electronics further includes a plurality of function buttons for input of informative data.

18. A dual system portable electronic communicator as claimed in claim 14 wherein the power source with digital signal transceiving electronics further includes an input device including a trackball or touchpad.

* * * * *